Dec. 7, 1948.  L. TROMBETTA  2,455,833
CLAMPING AND KNOT TYING INSTRUMENT
Filed Sept. 9, 1946  3 Sheets-Sheet 1
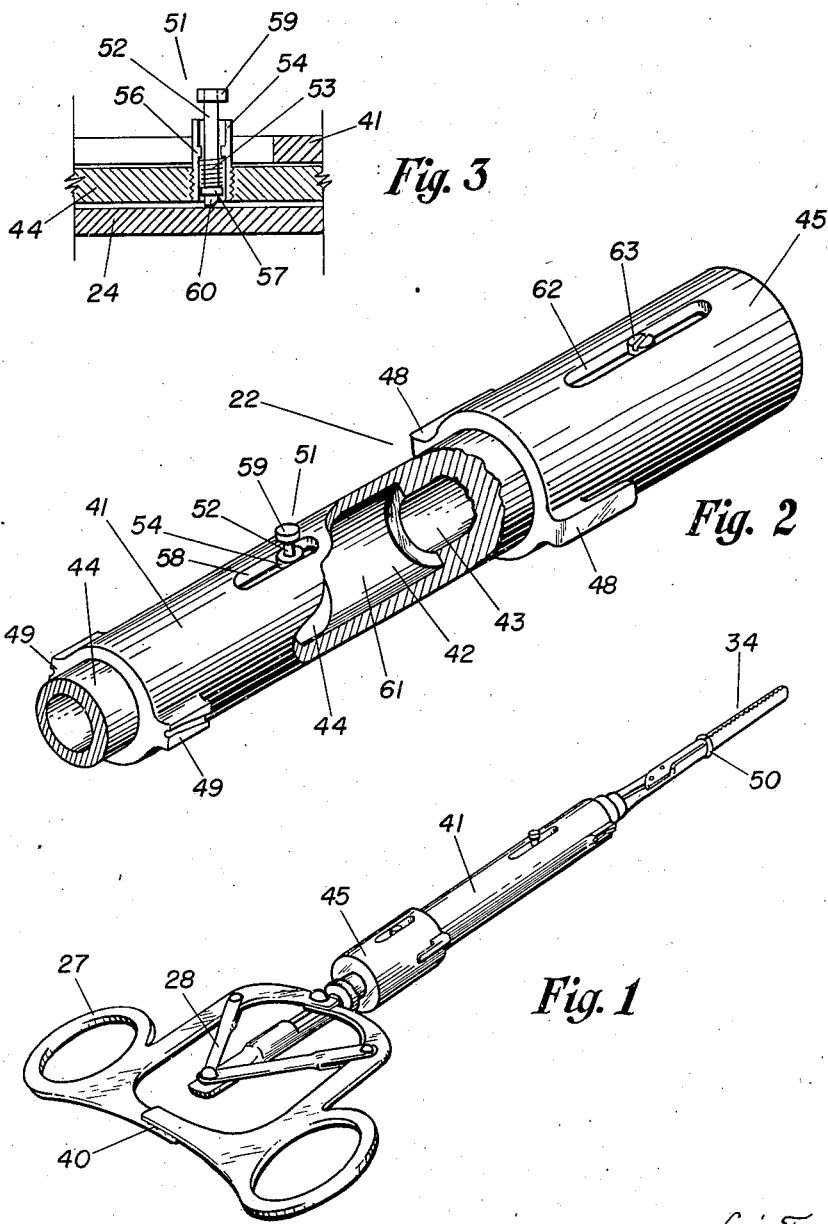
Louis Trombetta
INVENTOR.
BY William Wolfe
ATTORNEY

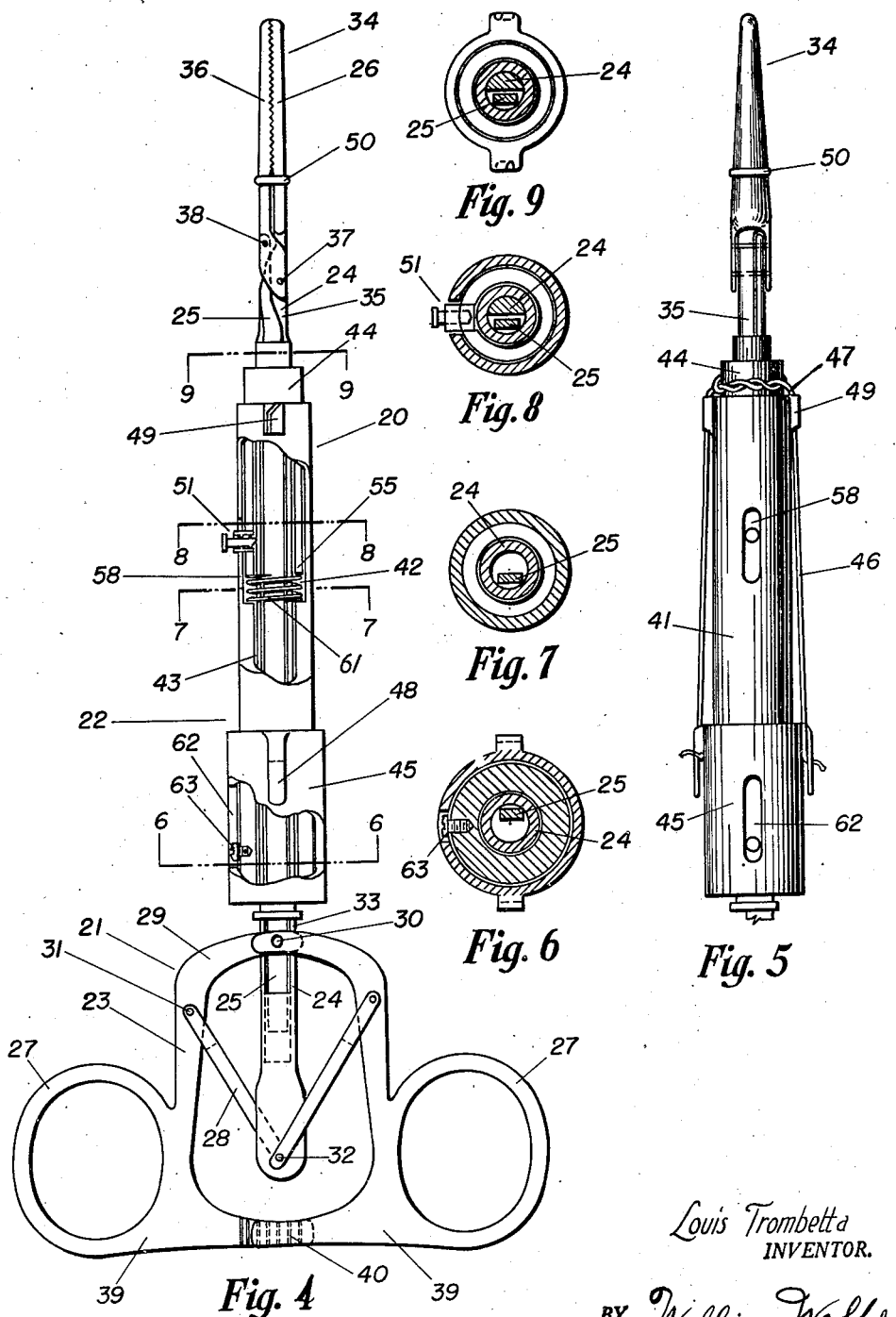

Dec. 7, 1948. L. TROMBETTA 2,455,833
CLAMPING AND KNOT TYING INSTRUMENT
Filed Sept. 9, 1946 3 Sheets-Sheet 3

Louis Trombetta
INVENTOR.

BY William Wolfe
ATTORNEY

Patented Dec. 7, 1948

2,455,833

UNITED STATES PATENT OFFICE 2,455,833

CLAMPING AND KNOT TYING INSTRUMENT

Louis Trombetta, Bronx, N. Y.

Application September 9, 1946, Serial No. 695,616

14 Claims. (Cl. 128—326)

This invention relates to clamping and knot tying instruments and more specifically to a surgical instrument capable of clamping and suturing an object as a blood vessel.

The normal method of suturing an object as a blood vessel is by drawing a ligature or cord under and about the object and then weaving it into a knot by means of a ligature carrier. The instrument employed is a simple forceps and is used as an extension of the fingers. Knot carriers for formed ligature knots have been designed but not used. These designs show simple forceps with a hook for retaining the knot but no means of displacing the knot from the forceps, positioning it on the object, or for tightening the knot.

The success of an operation, to a great extent depends on the speed and sterility with which it is performed. The instruments previously discussed do not add greatly to the speed of the operation or increase its sterility as they do not reduce or lessen materially the number of the manual movements of the operator, or increase the sterility of the operation by permitting the operator to retain his hands out of contact and at a distance from the scene of the operation. In addition, these instruments require guided, precise and skilful manipulation and a complete view of the operating field.

The presently described instrument has been invented and designed with the express aim of decreasing the number of the manual movements of the operator in clamping and ligaturing or suturing an object, and of permitting the operator to apply a ligature knot without observing the functioning parts of the instrument or the object about which the knot is being tied during the ligaturing.

Often it is an open question in the mind of the operator whether a blood vessel will close by itself and stop bleeding or will require a suture or ligature knot. In such a case the operator may apply a needless ligature or knot or may apply a clamp and later have to replace the clamp with a knot. The present instrument is designed to bypass this problem as the clamping and knot tying device can be used first as a clamp and subsequently be operated to tie the ligature.

The instrument is designed also for tonsillectomies where the patient's mouth is small as a child's, abdominal and other operations where the blood vessels and other elements which must be sutured or tied are in hidden, partly obscured and obstructed positions into which it is difficult to reach and manipulate instruments or the fingers.

Often in an operation, a plurality of elements must be tied up or knotted, requiring, in the instruments heretofore used, a re-threading or an individual instrument for each knot, resulting in either an increase in the time spent in the operation or in the number of instruments used. In order to overcome this situation, the present instrument is designed in two parts, one being a forceps and the other a multiple of pre-loaded cartridges, any one of which can be quickly and easily positioned on the forceps. This structure, therefore, permits the use of a single pair of forceps and provides for quick loading as the knots can be formed, positioned and sterilized on its cartridge prior to the operation.

In detail, an object of the invention is to produce a combination clamp and knot tier which can function as a clamp or a knot tier or both.

Another object is to produce a combination instrument which can be operated speedily and mechanically as a knot tier without skilled manipulation or observation.

A further object is to form a forceps and ligature knot carrying cartridge instrument in which the cartridge can be easily and quickly assembled or disassembled on the forceps.

Another object is to form a knot carrying and ejecting forceps which can be operated without the use of any extraneous means to deposit the knot and which instrument is of a size and nature as to be operable in small openings and in difficult positions.

A further object is to form an instrument of the above type which is easily taken apart and is of simple design so that it can be cleansed and sterilized thoroughly.

These and other objects are accomplished by forming my forceps and ligature knot carrying and tightening instrument of a pair of forceps, a knot carrying cartridge and a stop means, the cartridge being telescopingly formed of an inner and outer element, the inner element in its extended position having an exposed surface capable of carrying a knot and the outer element being capable of overriding the inner element and ejecting the knot so carried therefrom and the spring positioned between the inner and outer elements and being capable of transmitting longitudinal pressure from the outer element to the inner element and the stop means partly positioned on and functioning between the inner element and the jaws of the forceps to stop a forward travel of the inner element when its forward end becomes aligned with the forward end of the jaws, whereby a forward travel of the outer element, through the spring, carries the inner element toward the jaws until halted by the stop means and further advance of the outer element, after the inner one has stopped, overrides its end carrying the knot and ejects it onto and about the object gripped by the jaws. A longitudinally slidable ring carried by the outer element and bearing the ends of the knot in catches can be retracted now tightening the knot.

For further comprehension of the invention, and of the objects and advantages thereof, reference will be had to the following description and accompanying drawings and to the appended claims in which the various novel features of the invention are more particularly set forth:

In the accompanying drawings, forming a material part of this disclosure:

Fig. 1 is a perspective view of a forceps and ligature knot carrying, ejecting and tightening instrument comprised of a pair of forceps and a cartridge.

Fig. 2 is a perspective view, partly cut away, of the cartridge, showing its knot carrying element, stop means and knot tightening element.

Fig. 3 is a detail, partly in section, of the stop means.

Fig. 4 is a plan view, partly cut away, of the instrument showing the forceps, its jaws and handle and the cartridge.

Fig. 5 is a plan view showing the cartridge in a retracted position, the jaws of the forceps and a ligature knot positioned about the knot carrier of the cartridge with the knot ends supported in their catches.

Fig. 6 is a sectional view along the line of 6—6 of Fig. 4.

Fig. 7 is a sectional view along the line of 7—7 of Fig. 4.

Fig. 8 is a sectional view along the line of 8—8 of Fig. 4.

Fig. 9 is a sectional view along the line of 9—9 of Fig. 4.

Figure 13:
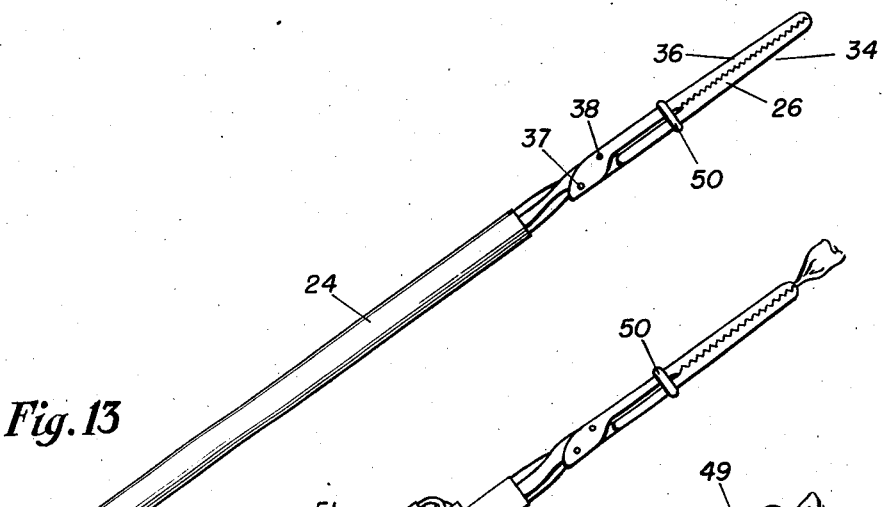
Fig. 13 is a fragmentary view of the jaw and rod part of the forceps.
Figure 10:
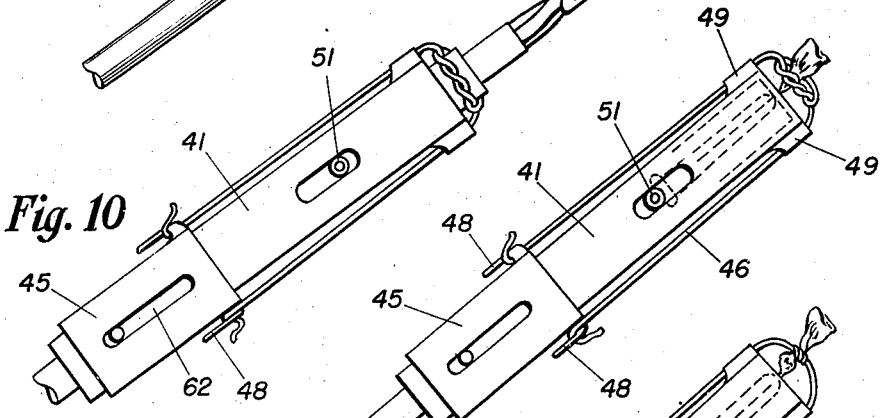
Fig. 10 is a plan view of the cartridge and jaws, the cartridge in a retracted position, with its knot carrier supporting a ligature knot, the knot ejector retracted and the jaws gripping a blood vessel.
Figure 11:
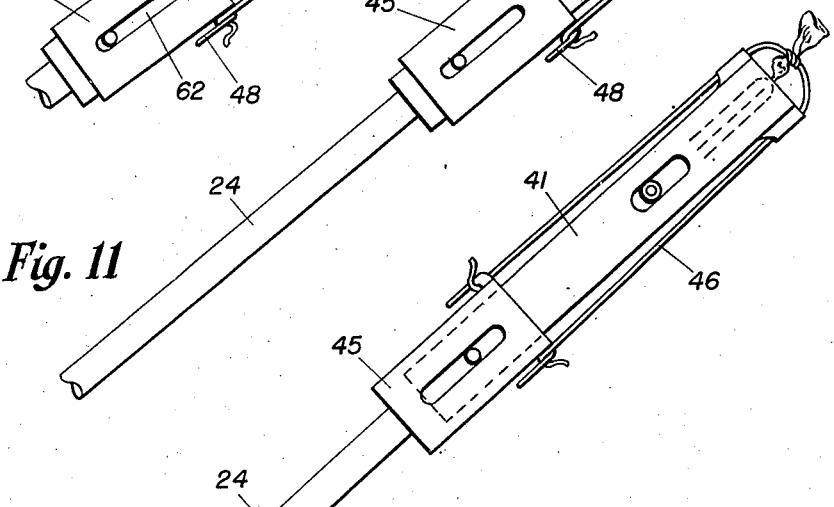
Fig. 11 is a plan view of elements shown in Fig. 10 but with the cartridge advanced, with its knot carrier aligned with the jaws, the knot ejector aslo aligned with the jaws and knot carrier and having ejected or forced the loose knot from about its carrier onto and about the blood vessel.
Figure 12:
Fig. 12 is a plan view of the elements shown in Figs. 10 and 11 but with the knot tightener retracted and the knot tightened about the blood vessel.

In the drawings and in the specifications, in which identical numbers represent similar elements, a clamping and ligament tying surgical instrument 20 is shown comprised of a pair of forceps 21 and a ligature carrying and tying tubular cartridge 22, slideably and detachably mounted thereupon, the forceps 21 being able to grip and hold a vein, artery or element about which and while the ligature knot is to be tied, and the cartridge carrying the ligature with a pre-formed, loose knot in its forward part and being able to slide the knot onto and draw it tight about the artery.

The pair of forceps is comprised of a jaw motivating handle mechanism 23, a tubular rod 24, a solid rod 25 and a pair of jaws 26. The handle mechanism 23 operates the jaws through the tubular and solid rods, which act together with the handle elements as a toggle linkage to open and close the jaws as the handle elements are spread and converged manually.

In detail, the handle mechanism 23 is formed of a pair of finger grips 27 and a pair of links 28, each of the grips having an integrally formed bent arm 29, which arms extend toward each other with their ends overlapping and resting over an end of the solid rod. A pin 30 pivotally secures the arm ends and solid rod together. The links 28 extend between the bent arms and an end of the tubular rod, pins 31 rotatably securing ends of the links to the bent arms intermediate the grips and the pin 30, and pin 32 securing the overlapping ends of the links to the end of the tubular rod. The tubular rod 24, which encases and slideably holds the solid rod 25 is provided with a cut away section 33 which permits the pinned ends of the bent arms to rest in close contact with the solid rod, and the arm ends and solid rod to travel together longitudinally of the tubular rod. This arrangement of pivoting the ends of the bent arms to the solid rod and linking an intermediate part of the bent arms to the tubular rod permits a longitudinal articulation of the solid rod relative to the tubular rod when the finger grips at the free ends of the bent arms are operated.

The jaws 26 are formed at the ends of the tubular and solid rods, 24 and 25, respectively, removed from the handle. One jaw element 34, of the jaws 26 is formed at the end of and integral with a solid section 35 of the tubular rod, positioned adjacent the end of the solid rod 25. The other jaw element is rotatably secured at one of its ends by a pin 37 to the solid section 35 of the tubular rod, and intermediate its ends but in the vicinity of the pin 37, it is rotatably secured by a pin 38 to the solid rod 25. The jaw element 36 is thus hinged by the pin 37 to open and close against the immovable jaw element 34 of the tubular rod and is articulated by the solid rod 25 through the pin 38, and the solid and tubular rods are articulated themselves by the operation of the handle grips. The positioning of the pins 37 and 38 close together permits the tubular rod to enclose the solid rod quite closely and still allow enough lateral play to provide for the sidewise movement of the solid rod end during the rotation of the pin 38 about the pin 37.

Locking means to hold the finger grips, and through them the jaws, in any desired position is provided by forming projections 39 on each of the finger grips. The projections extend toward each other and overlap, and opposite faces of the projections are provided with opposing teeth 40 which form a ratchet, the teeth being capable of engaging and holding static the finger grips until a superior manual operative force is applied.

The cartridge 22 is comprised of a tubular element 41 which telescopingly carries within an enlarged portion 42 of its bore 43 at one of its ends, a slidable ligature knot carrier 44 and about itself at its other end, a slidable ligature end bearing piece 45. The cartridge is positioned on the tubular rod 24 with the carrier 44 at the jaw end and the piece 45 at the handle end of the instrument. A ligature 46 is formed with a loose knot 47 resting about the end of the carrier extending from the tubular element and with the ligature ends resting in catches 48 on the piece 45. Guides 49 at the end of the tubular element support the ligature between its knot and ends. The cartridge is operated to tie the ligature knot about the veins, artery or element by sliding the knot off the carrier and about the jaw gripped vein and retracting or forcing the end bearing piece away from the knot until the knot becomes tight.

In order to slide the knot off its carrier, a stop means for the forward travel of the carrier, which will not stop the forward travel of the tubular element, is provided comprised of a shoulder or flange 50 and a stud 51, the flange being formed on the jaws intermediate their ends, and the stud on the carrier, the stud and flange being positioned the same distance back of their forward ends. Thus when the stud contacts the flange, the forward ends of the carrier and jaws are aligned and the knot is ejected into the vein adjacent the jaw ends. The stud 51 is formed with a pin 52 and a spring 53 within a tube 54, the tube being threaded into the carrier in the vicinity of its rear end 55, the tube having an inwardly extending flange 56 and the pin having a flange 57, the spring extending about the pin and acting between the flanges to force the pin downward toward the tubular rod 24.

The outer or exposed end of the pin, which extends through a longitudinal slot 58 in the tubular element 41, has a removable head 59 and the inner end of the pin, a wedge shaped tip 60, the sloping part of the wedge facing the rear end of the carrier. The tip of the pin rests resiliently against and slides along the surface of the tubular rod and when the carrier is in its forward position it rests against the flange 50 of the jaws and so bars further forward travel of the carrier.

A spring 61 rests within the enlarged bore 42 of the elements 41 and bears against a shoulder 62 of the element 41, formed by the change in bores of the tubular element, and the rear end 55 of the carrier and resiliently urges the carrier forward when the tubular element is advanced. However, when the pin of the stud on the carrier hits the flange of the jaws, the carrier is stopped but the tubular element can continue to advance, the stud riding in the slot 58. This continued advance of the tubular element 41 over the carrier while it is at rest, pushes or slides the ligature knot from about the carrier onto the vein or artery being held or gripped by the jaws.

The bearing piece 45 extends, collar like, about the tubular element 41 and is provided with a longitudinal slot 62. A screw 63, which is threaded into the tubular element, extends into the slot 62 and longitudinally and slidably retains the piece on the tubular element, so that the piece can be moved relative to the element. The catches 48, which carry the ends of the ligature are positioned on the outside of and on opposite sides of the piece and are in the form of bent arms parallel to the piece itself. Thus, after the ligature knot is slid over the vein or artery by the overriding of the carrier by the tubular element, the retraction of the piece 45 from its forward position, with the screw 63 at the head end of the slot 62 away from the jaws, tightens the knot in the ligature. The whole cartridge could be retraced in place of the piece, but this might permit the ligature knot to slide back over the jaws. The fact that the forward end of the carrier and the tubular element can remain at rest while the knot is being tightened definitely locates the position of the knot immediately beyond the jaws.

The instrument 20 is prepared for use after the required sterilization of all its elements and parts, in the following manner: First, the cartridge 22 is loaded, a loose ligature knot being formed about the knot carrier 44 with the ends of the ligature hooked over the catches of the piece 45; second, the cartridge 22 is positioned on the forceps 21 by sliding the jaws of the forceps through the bore of the tubular element, until the stud 51 on the knot carrier 44 passes the flange 50 on the jaws. The loaded instrument now can be easily used by: first, clamping the forceps over the element to be ligatured; second, advancing the tubular element as far forward as possible; third, retracting the end bearing piece 45; and fourth, freeing the ends of the ligature from the catches holding them on the bearing piece 45. The process of gripping the vein, sliding the knot onto it and drawing taut the knot takes only a fraction of a second and the act of sliding the knot and drawing it tight is entirely mechanical, no practise or skill being required and the act being done without watching the knot or using any care.

The instrument can be easily disassembled into forceps, cartridge and spring 61 for cleansing, by lifting the pin of the stop means so that the cartridge can be slid off and separated from the forceps. The cartridge, itself, can be disassembled further into the tubular element, knot carrier and ligature end bearer by unscrewing the tube 54 of the stud 51 from the knot carrier 44, permitting the knot carrier to be removed from the tubular element 41 and removing the screw 62, permitting the bearing piece to be slid off the tubular element.

It should be observed that the instrument can be used as a surgical clamp by gripping an element with the jaws and then setting the locking means. This holds the gripped element and, if later it is desired to suture the element, all that is now needed is, to use the loaded cartridge.

One pair of forceps can be provided with a plurality of cartridges to form a multiple unit as during an operation it is a simple matter to load the instrument by sliding the cartridges onto the forceps.

Although I have described my instrument in connection with the surgical art, the device can be used anywhere and in any field for the purpose of tying or positioning a knot about an object.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new and novel, and desire to secure by United States Letters Patent is:

1. A clamping and knot carrying ejecting and tightening instrument, comprised of a clamping element, knot carrying means, knot ejecting means and knot drawing means, the means all being carried and supported by the element and being removable therefrom and assemblable thereto as a unit and being capable of being equipped with a cord to tie a suture prior to assembling onto the clamping means and the carrying and ejecting means being relatively movable to eject and position the knot and the drawing means having retaining pieces capable of gripping the end portions of the knot and being slidably positioned on the instrument to move away from the deposited knot and draw it tightly.

2. An instrument for clamping an object and depositing a knot thereabout, comprised of a pair of forceps, tubular knot carrying means and tubular knot ejecting means, the knot carrying means slidably positioned on and carried by the forceps and the ejecting means positioned about the carrying means and co-acting with the carrying means to remove the knot from the carrying means to the object.

3. An instrument for clamping an object and depositing a knot thereabout, comprised of gripping means capable of holding the object and knot carrying and depositing means, the said means tubularly, longitudinally, slidably encasing the gripping means and having tubular telescoping elements relatively longitudinally slidable and the inner of said elements having in its extended position, an exposed portion capable of carrying a knot.

4. An instrument for clamping an object and depositing a knot thereabout, comprised of forceps gripping means capable of holding the object and knot carrying and depositing means, said knot carrying and depositing means being longitudinally slidably secured to the forceps means and having telescoping elements, the inner of said elements in its extended position having an exposed end portion capable of bearing the knot thereabout and the outer of said elements being capable of overriding the end portion and displacing the knot therefrom.

5. An instrument for clamping an object and depositing a knot thereabout, comprised of forceps gripping means capable of holding the object and knot carrying and depositing means, said knot carrying and depositing means being longitudinally slidably secured to the forceps means and having telescoping elements, the inner of said elements in its extended position having an exposed end portion capable of bearing the knot thereabout and the outer of said elements being capable of overriding the end portion and displacing the knot therefrom, and the forceps gripping means and the inner element of the knot carrying and depositing means together having stop means positioned and functioning therebetween to arrest a forward travel of the end portion of said inner element beyond the forward end of the means.

6. An instrument for clamping an object and depositing a knot thereabout, comprised of a gripping means and means longitudinally slidably secured to said gripping means, said slidable means being removable and assemblable to said gripping means and being able to be provided with a cord for tying a suture while in its disassembled state, said longitudinally slidably secured means having a piece longitudinally slidably disposed relative to itself to force a knot therefrom.

7. An instrument for clamping an object depositing a carried knot thereabout and drawing the knot tight, comprised of a pair of forceps and a cartridge, said forceps having handles, a toggle mechanism and jaws, the handles and jaws being positioned at opposite ends of the toggle mechanism and the jaws being articulatable by the handles through the toggle mechanism and the cartridge being disposed longitudinally and slidably on the toggle mechanism and having telescoping sections and a ring, the inner one of said sections in its extended position having in its extended position an exposed surface carrying the knot and the outer of said telescoping sections being capable of overriding the inner section and forcing its knot from its surface, and the ring being slidably disposed on the outer section and having catches suitable for carrying the ends of the knot whereby after the outer section had overridden the inner section and deposited the knot the ring can be slid away from the knot and tightened.

8. An instrument for clamping an object depositing a carried knot thereabout and drawing the knot tight, comprised of a pair of forceps, a stop and a cartridge, said forceps having handles, a toggle mechanism and jaws, the handles and jaws being positioned at opposite ends of the toggle mechanism and the jaws being articulatable by the handles through the toggle mechanism and the cartridge being disposed longitudinally and slidably on the toggle mechanism and having telescoping sections and a ring, the inner one of said sections in its extended position having in its extended position an exposed surface carrying the knot and the outer of said telescoping sections being capable of overriding the inner section and forcing its knot from its surface, and the ring being slidably disposed on the outer section and having catches suitable for carrying the ends of the knot, and the stop being positioned and functioning between the jaws of the forceps and the inner section whereby the forward travel of the inner section can be halted permitting the outer section to override the inner and deposit the knot carried thereon and the ring can be slid away from the knot to tighten it.

9. An instrument for clamping an object depositing a carried knot thereabout and drawing the knot tight, comprised of a pair of forceps, locking means therefor, and a cartridge, said forceps having handles, a toggle mechanism and jaws, the handles and jaws being positioned at opposite ends of the toggle mechanism and the jaws being articulatable by the handles through the toggle mechanism, the locking means positioned in the handle gripping means and formed of co-acting, adjacent oppositely positioned projections to hold the gripping means in a clamping position, and the cartridge being disposed longitudinally and slidably on the toggle mechanism and having telescoping sections and a ring, the inner one of said sections in its extended position having in its extended position an exposed surface carrying the knot and the outer of said telescoping sections being capable of overriding the inner section and forcing its knot from its surface, and the ring being slidably diposed on the outer section and having catches suitable for carrying the ends of the knot whereby after the outer section had overridden the inner section and deposited the knot the ring can be slid away from the knot and tightened.

10. An instrument for clamping an object and depositing a knot thereabout, comprised of a pair of forceps, knot carrying means, knot ejecting and a stop means, the pair of forceps having handles, rods and jaws, the handles and jaws being positioned at opposite ends of the rods and the jaws being articulatable by the handles through the rods, the knot carrying means being tubular in shape and extending slidably about the rods, the knot ejecting means being tubular in shape and extending slidably about the rods, the knot ejecting means being tubular in shape and extending slidably about the knot carrying means and in contact therewith to transmit a longitudinal motion thereto, and the stop means having a coacting projection on the jaws and a pin on the knot carrying means whereby the travel of the knot carrying means is terminated at the stop without impeding the travel of the knot ejecting means which can override the carrying means and deposit the knot.

11. An instrument for clamping an object, and depositing a knot thereabout, comprised of a pair of forceps, and a cartridge, said forceps having handles, a toggle mechanism and jaws, the handles and jaws positioned at opposite ends of the toggle mechanism and said handles being capable of articulating the jaws through the toggle mechanism and the cartridge longitudinally slidably positioned on the toggle mechanism and being capable of being advanced onto the jaws, having telescoping elements and a spring, the inner element having in its extended position an exposed surface capable of containing a knot and the outer element being able to override the inner element and eject the knot therefrom and the spring being positioned between the inner and outer elements and able to transmit force from the outer element to the inner element whereby when the outer element is advanced towards the jaws it urges the inner element towards the jaws.

12. An instrument for clamping an object, and depositing a knot thereabout, comprised of a pair of forceps, a cartridge and a stop means, said forceps having handles, a toggle mechanism and jaws, the handles and jaws positioned at opposite ends of the toggle mechanism and said handles being capable of articulating the jaws through the toggle mechanism and the cartridge longitudinally slidably positioned on the toggle mechanism and being capable of being advanced onto the jaws, having telescoping elements and a spring, the inner element having in its extended position an exposed surface capable of containing a knot and the outer element being able to override the inner element and eject the knot therefrom and the spring being positioned between the inner and outer elements and able to transmit force from the outer element to the inner element and the stop means having coacting opposing projections on the jaws and inner element whereby when the outer element is advanced towards the jaws it urges the inner element towards the jaws until the projection of the inner element co-acts with the projection of the jaws.

13. A surgical cartridge capable of carrying a suture knot for use with a pair of forceps comprised of telescoping tubular elements, a spring therebetween and a stop means on the inner of said telescoping elements, the inner element in its extended position having an exposed surface capable of bearing the knot and the outer element being capable of co-acting with the inner element to eject the knot therefrom and the stop being positioned to extend into the bore of the inner element to retain the cartridge on a pair of forceps.

14. A surgical cartridge, for carrying a suture knot, capable of use with a pair of forceps, comprised of co-acting tubular elements, a spring and a stop means, one of said tubular elements having an exposed surface capable of bearing the knot and the spring positioned and functioning between the tubular elements to transmit longitudinal pressure from the one to the other and the tubular element bearing the knot so positioned in relation to the other element that a relative movement of the other to the one causes the knot to be ejected therefrom and the stop means being retractably positioned in the bore of the one so that the cartridge can be assembled on a pair of forceps and yet act as a stop to limit the travel of the one tubular element.

LOUIS TROMBETTA.

REFERENCES CITED

The following references are of record in the file of this patent:

UNITED STATES PATENTS

| Number | Name | Date |
|---|---|---|
| 1,625,602 | Gould et al. | Apr. 19, 1927 |

FOREIGN PATENTS

| Number | Country | Date |
|---|---|---|
| 393,010 | Great Britain | June 1, 1933 |